United States Patent [19]

Inuiya

[11] Patent Number: 5,601,956
[45] Date of Patent: Feb. 11, 1997

[54] FILM UNIT WITH LENS AND DEVELOPMENT METHOD THEREOF

[75] Inventor: Masafumi Inuiya, Asaka, Japan

[73] Assignee: Fuji Photo Film Co., Ltd., Kanagawa, Japan

[21] Appl. No.: 417,128

[22] Filed: Apr. 5, 1995

[30] Foreign Application Priority Data

Apr. 8, 1994 [JP] Japan .................................. 6-070662

[51] Int. Cl.⁶ .................................................. G03B 17/24
[52] U.S. Cl. ................................ 430/21; 396/6; 396/284; 396/315; 396/319
[58] Field of Search .................................. 354/106, 217, 354/289.1; 430/21

[56] References Cited

U.S. PATENT DOCUMENTS

| | | | |
|---|---|---|---|
| 4,954,857 | 9/1990 | Mochida et al. | 354/217 |
| 5,036,344 | 7/1991 | Inoue et al. | 354/106 |
| 5,229,810 | 7/1993 | Cloutier et al. | 354/106 |

Primary Examiner—Mark F. Huff
Attorney, Agent, or Firm—Sughrue, Mion, Zinn, Macpeak & Seas

[57] ABSTRACT

The present invention provides a film unit with a lens in which data such as a taking date can be taken at a low price. The IC substrate is put together while the film unit with lens is assembled. The timer in the IC times the current date and time. The date mode selector outputs the information, which is selected by the mode select switch, to the memory. The release sensor switches in synchronous with the release of the shutter button and outputs the current frame number information, which is counted by the frame number counter, to the memory so as to increase the frame number of the frame number counter. Moreover, the release sensor writes the information outputted from the timer and the information outputted from the date mode selector in the addresses 1–36 so as to correspond to the frame number information from the frame number counter in interlocking with the release of the shutter. Therefore, the taking date and time information of the film are written in the addresses 1–36 of the memory in turn. The information, which is written in the memory of the IC, is displayed on the display and projected on the frame P of the film F so as to be printed.

16 Claims, 8 Drawing Sheets

| ADDRESS | Y(4BIT) | M(4BIT) | D(5BIT) | H(5BIT) | M(6BIT) | MODE(2BIT) |
|---|---|---|---|---|---|---|
| 1 | 0001 | 1000 | 01110 | 10010 | 011011 | 10 |
| 2 | | | | | | |
| 3 | | | | | | |
| 4 | | | | | | |
| 5 | | | | | | |
| 29 | | | | | | |
| 30 | | | | | | |
| 31 | | | | | | |
| 32 | | | | | | |
| 33 | | | | | | |
| 34 | | | | | | |
| 35 | | | | | | |
| 36 | | | | | | |

FILM UNIT WITH LENS AND DEVELOPMENT METHOD THEREOF

BACKGROUND OF THE INVENTION

1. Field of the Invention

The present invention relates to a film unit with a lens and a development method thereof, more particularly to a photo film wrapping unit (hereinafter, called "a film unit with a lens") which had previously an exposure function for photographing, and a development method of the film.

2. Description of the Related Art

Conventionally, the present applicant discloses a film unit with a lens in which a taking lens is arranged in a 135 film stored in a patrone. The user can get the film unit with the lens for a low price at any shop like getting an ordinary photo film, and after photographing, the user can ask for developing and printing of the film unit with the lens just as in the case of the conventional photographic film.

However, when the conventional film unit with the lens is tried for providing a function for taking a photographing date in the photo film at the time of photographing like the ordinary camera, that is, a function for taking in the data, it must be arranged with a timer for getting the date and the current time, a LCD (liquid crystal display) for displaying the date and the current time which are recorded by the timer, displays such as a LED (light emitting diode), a lamp for lighting the data, which are displayed on the displays, in interlocking with a release and a projection lens for projecting the data displayed on the display in the photo film, therefore, there is an disadvantage in that it is very expensive.

SUMMARY OF THE INVENTION

The present invention has been developed to eliminate the above-described disadvantage and has as its aim the provision of a film unit with a lens and a development method thereof wherein the data such as a photographing date can be recorded on the film for a low price.

To achieve the above-described object, a film unit with a lens in which a taking mechanism such as a taking lens and a shutter is provided in a light proof case and a film in a roll is loaded in said light proof case; wherein said film unit with said lens is provided with a date record unit which comprises release detecting means for detecting a release of said shutter, count means for counting a frame number in said film based on a release information from said release detecting means, timer means for timing a current date and/or time, memory means, and writing means for writing date and/or time information, which is timed by said timer means in interlocking with the release of said shutter, in the memory means so as to correspond with the frame number which is counted by said count means.

Also to achieve the above-described object, said date record unit is removed from said film unit with said lens after photographing, said date and/or time information, which corresponds to said frame number written in said memory means, is read out, and then the date and/or time information, which is read out, is printed on each frame of said film, which corresponds to said frame number of said date and/or time information, before developing and developed.

In an alternative method to achieve the above-described object, said date record unit is removed from said film unit with said lens after photographing, said date and/or time information, which corresponds to said frame number written in said memory means, is read out, and then the date and/or time information, which is read out, is printed on a print surface so as to correspond to a frame number of each frame while a developed film is being printed.

As another alternative method to achieve the above-described object, said date record unit is removed from said film unit with said lens after photographing, said date and/or time information, which corresponds to said frame number written in said memory means, is read out, and then the date and/or time information, which is read out, is recorded in a magnetic record layer of each frame of said film, which corresponds to said frame number of said date and/or time information.

In the present invention, it is confirmed whether the data such as a taking date is taken or not when a printed photograph is returned from a camera shop which acts as an agent for developing and printing, not when photographing. That is, according to an embodiment of a film unit of the present invention, the film unit with the lens is provided with a date record unit which comprises release detecting means for detecting a release of said shutter in the film unit with the lens, count means for counting a frame number in said film based on a release information from said release detecting means, timer means for timing a current date and/or time, memory means, and writing means for writing date and/or time information, which is timed by said timer means by interlocking with the release of said shutter, in the memory means so as to correspond with the frame number which is counted by said count means.

Therefore, according to the present invention, the current date and/or time information corresponding to the frame number can be written in the memory means by interlocking with the release of the shutter. The film unit with the lens thus costs lower than the conventional data taking function which has a display for a date, a lamp, and a projecting lens.

Further, according to a first embodiment of the development method of the present invention, first, the date record unit is removed from the film unit with the lens after photographing. Then, the date and/or time information, which corresponds to the frame number written in the memory means of the date record unit, is read out. The read-out date and/or time information is printed on each frame of the film, which corresponds to the frame number of the date and/or time information, before the film is developed. Therefore, a printed photograph, in which a date and/or time is printed, can be obtained.

According to a second embodiment of the development method of the present invention, first, the date record unit is removed from the film unit with the lens after photographing. Then, the date and/or time information, which corresponds to the frame number written in the memory means of the date record unit, is read out. The read-out date and/or time information is printed on each frame of the film, which corresponds to the frame number of the date and/or time information, is read out, so that the film can be developed. Therefore, a printed photograph, in which a date and/or time is printed, can be obtained.

According to a third embodiment of the development method of the present invention, first, the date record unit is removed from the film unit with the lens after photographing. Then, the date and/or time information, which corresponds to the frame number written in the memory means of the date record unit, is read out. The read-out date and/or time information is recorded in the magnetic record layer of each frame of the film which corresponds to the frame number of the date and/or time information. Therefore, the date and/or time information, which is recorded in the magnetic record layer, is reproduced, so that a printed photograph, in which a date and/or time is printed, can be obtained.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof, and wherein.

DESCRIPTION OF THE PREFERRED EMBODIMENT

A detailed description will hereafter be given of the preferred embodiment of a film unit with a lens and of three embodiments of a developing method thereof according to the present invention with reference to the accompanying drawings.

Figure 1:
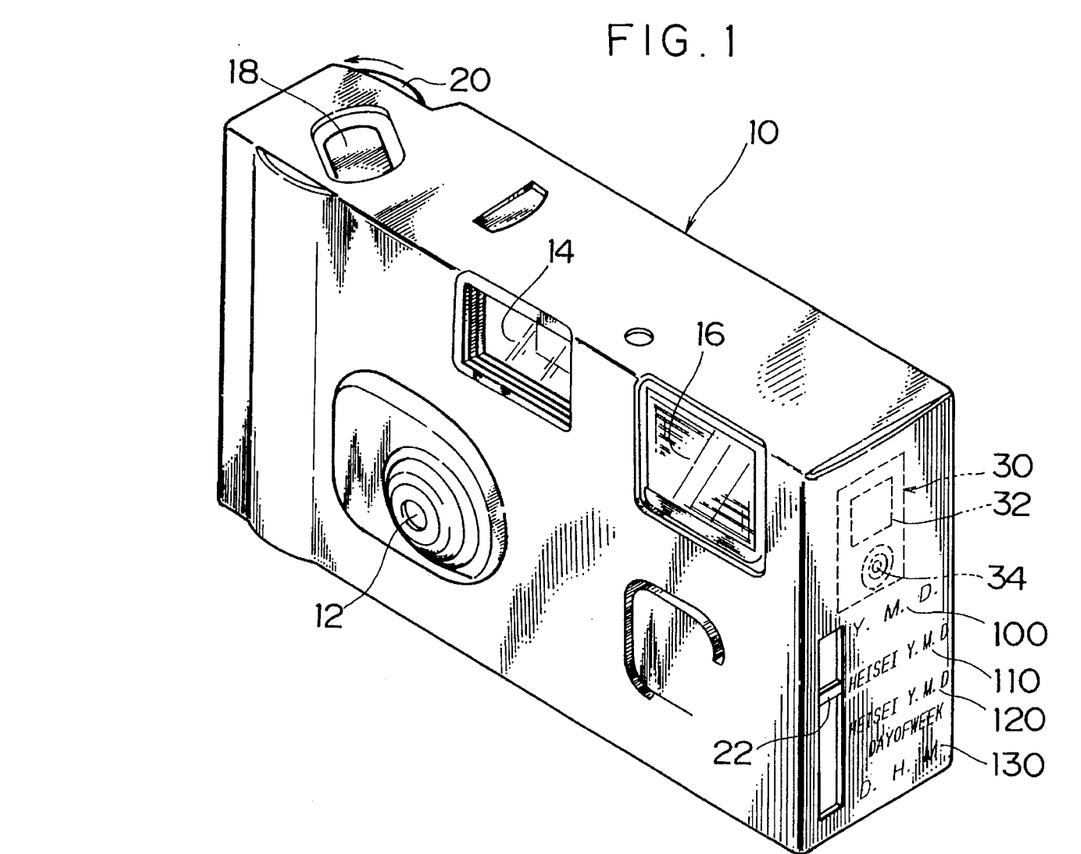
FIG. 1 is a perspective view showing an embodiment of a film unit with a lens according to the present invention.

FIG. 1 is a perspective view showing an embodiment of a film unit with a lens according to the present invention. A unit main body 10 of said film unit with the lens is manufactured by plastic molding, and is provided with a taking lens 12 at the front surface center, a finder 14 at the upper portion of the front surface center, a strobe light emitting part 16 at the right corner of the front surface upper part, a shutter button 18 at the left corner of the upper surface and a film winding knob 20 at the left corner of the back surface. And, the unit main body 10 is arranged therein with a patrone storage room and a storage room for storing the film which is pulled out from a patrone and is wound in a roll. The film, which is wound in a roll, is stored in the patrone which is stored in the patrone storage room by one frame by rotating the winding knob in the direction of the arrow in FIG. 1.

An IC (data record unit) substrate 30 shown by a dot line is placed inside and at the right side of the unit main body 10 in FIG. 1. The IC substrate 30 is arranged while the film unit with the lens is assembled. And mode select switch 22 is positioned at the right side of the unit main body 10 in FIG. 1. The mode select switch 22 will be described later.

Figure 2:
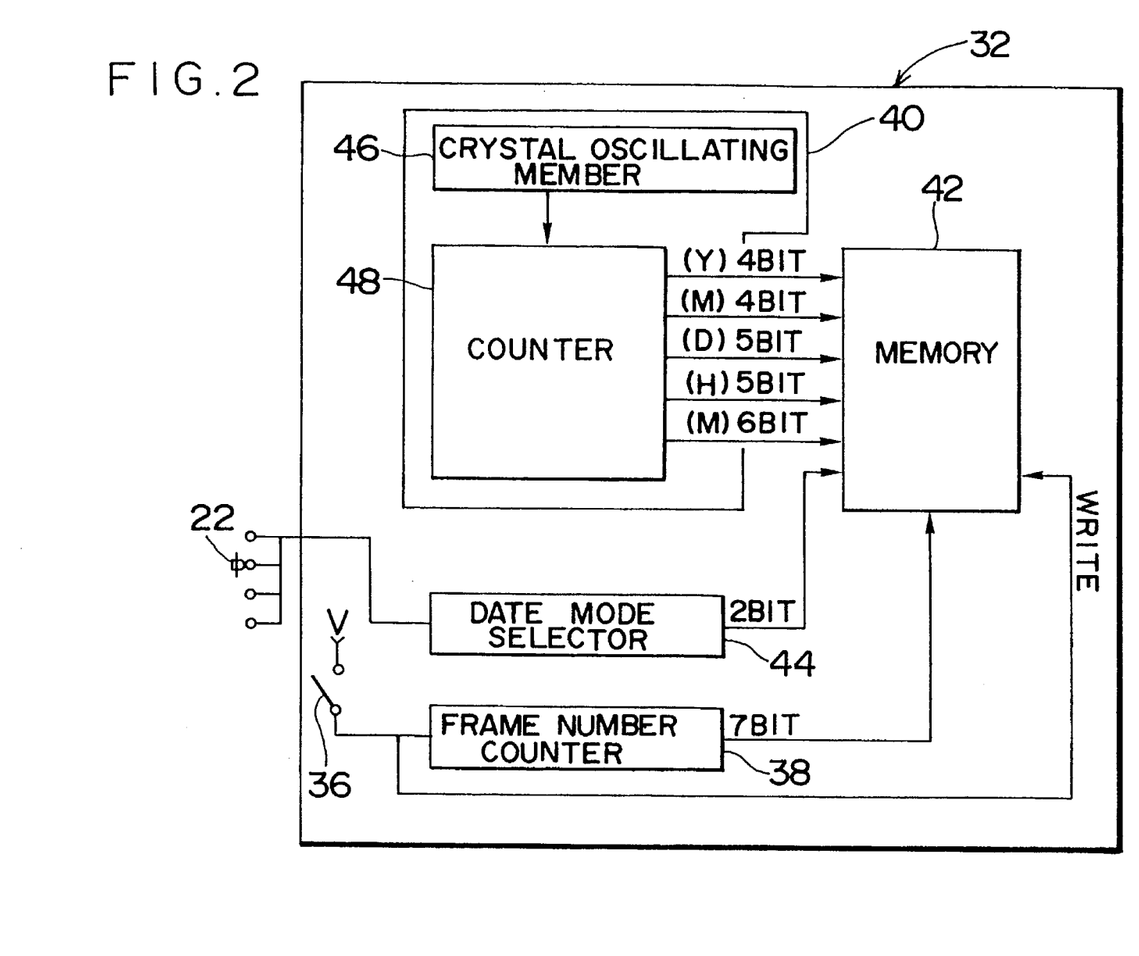
FIG. 2 is a block diagram of an IC mounted on the film unit with the lens.

An IC 32 and a button battery 34 for driving the IC 32 are fitted on the IC substrate 30. As shown in FIG. 2, the IC 32 comprises a release sensor 36, a frame number counter 38, a timer 40, a memory 42 and a date mode selector 44.

The timer 40 is composed of a crystal oscillating member 46 and a counter 48 for counting the oscillating number thereof, and while the IC substrate 30 is fitted, a current date and time are set and timed. And, the timer 40 outputs 4bit, 4bit, 5bit, 5bit, 6bit information showing respective current year, month, day, hour, minute to the memory 42. The date mode selector 44 outputs the 2bit information, which is selected by the mode select switch 22 shown in FIG. 1, to the memory 42. That is, the date mode selector 44 outputs one mode information among (see FIG. 1) a mode 100 showing the AD year, month, day, a mode 110 showing the era name year, month, day, a mode 120 showing the era name year, month, day, a day of the week and a mode 180 showing day, hour, minute, which is selected by the mode select switch 22, to the memory 42.

Figure 3:
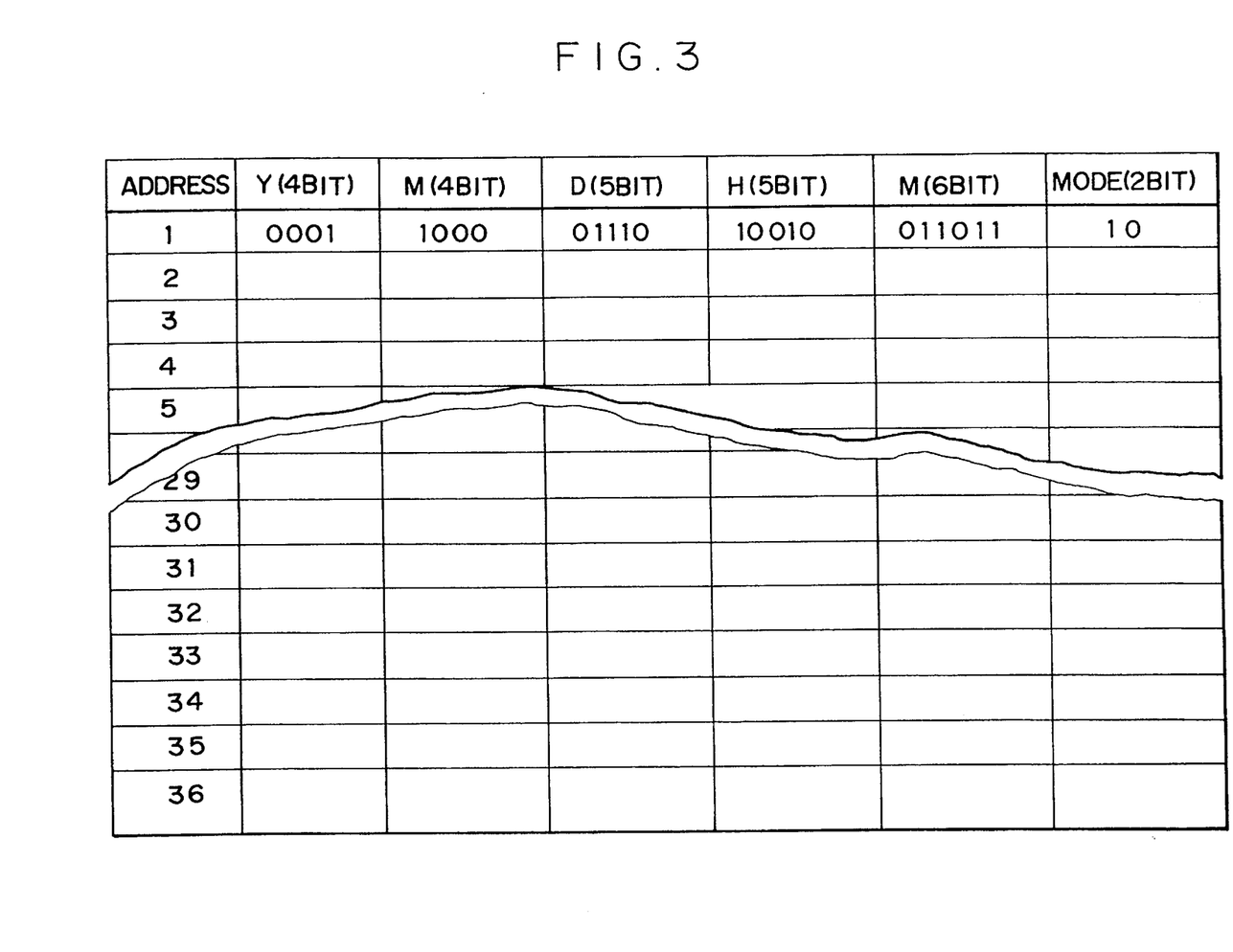
FIG. 3 is an explanatory view showing a memory data structure of a memory in the IC.

The release sensor 36 is switched synchronously with the release of the shutter button 18 (see FIG. 1), and outputs the current frame number information which is counted by the frame number counter 38 (for example, 6 bit information when a film with 36 frames are used) to the memory and the frame number of the frame number counter 38 is increased by one. And, the release sensor 36 works with the release of the shutter 18 so as to write the information from the timer 40 and the information from the date mode selector 44 in memory addresses 1–36, shown in FIG. 3, so as to correspond with the frame number information from the frame number counter 38. That is, a taking date and time information of the film is sequentially written in the address 1–36 whenever photographing.

Figure 4:
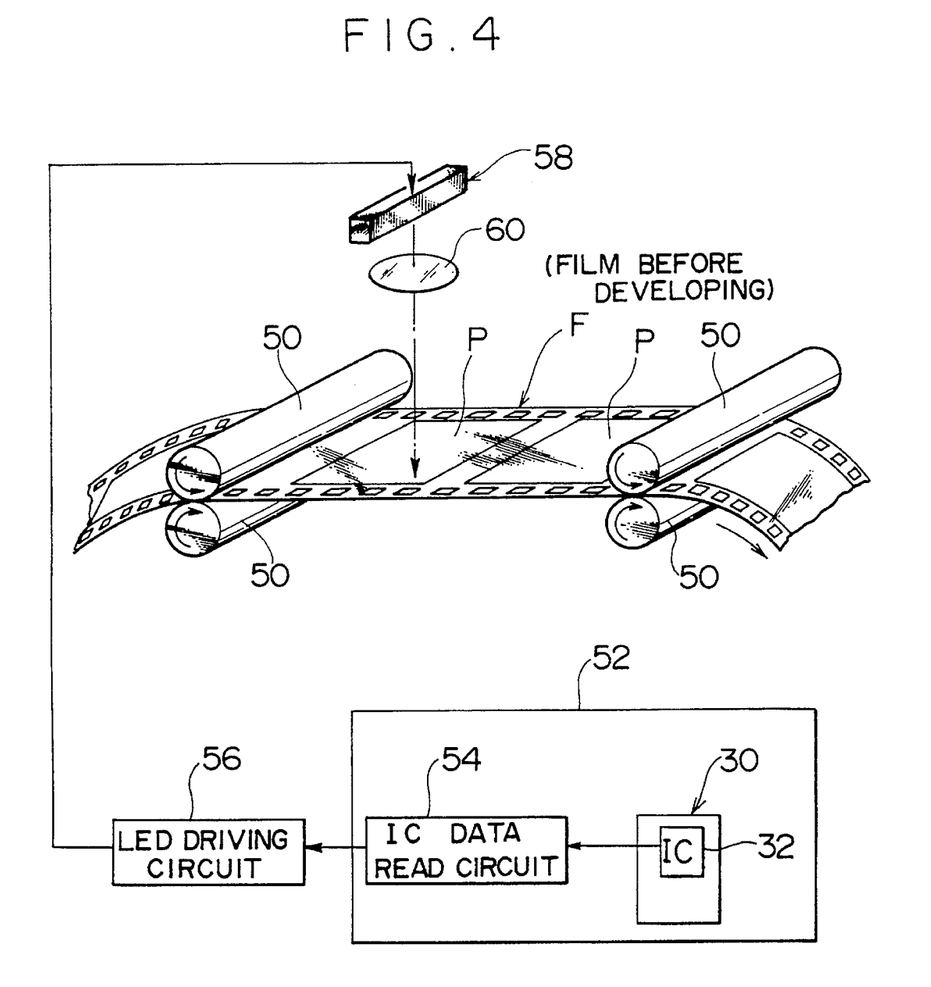
FIG. 4 is an explanatory view showing a first embodiment of the development method for the film unit with the lens.

Next, an explanation will be given of the development method of the film unit with the lens after photographing. FIG. 4 shows the first embodiment of the development method of the film unit with the lens according to the present invention. In the development method shown in FIG. 4, a taking date and/or time are printed in a film F before being developed.

First, when the film unit with the lens, which has finished photographing, is sent to a lab, the patrone in which the exposed film is stored and the IC substrate 30 are removed from the film unit with the lens and the button battery 34 is removed from the IC substrate 30 at the lab.

Next, the film, which is stored in the patrone, is taken out in a darkroom, and the film F which has been taken out before being developed is conveyed by conveyance rollers 50, 50 . . . in the longitudinal direction of the film F. Then, the IC substrate 30 is set in an IC data read system 52, and the taking date/time information and the mode information, which are written in the memory 42 of the IC 32, is read sequentially by the IC data read circuit 54. The information, which has been read, is outputted to the LED driving circuit 56 in turn, and the LED driving circuit 56 drives the display 58 based on the outputted information. The display 58 consists of many light emitting diodes (LED) and is positioned above a film conveyance path, and displays letters and numerals based on the information from the LED driving circuit 56. The letters and numerals, which are displayed on the display 58, are projected at the right corner in the frame P of the film F by the projecting lens 60.

That is, in this embodiment, the information, which is written in the address 1 of the memory 42, is projected to the first frame P of the film F so as to be printed, and the film F is conveyed by one frame. Thereafter, the information which is written in the address 2 is printed on the second frame of the film F. This operation is repeated, whereby the information, which corresponds to the frame number, can be printed on all frames of the film F. Therefore, the film F is in the same state as if the taking data had been taken in at the time of the photographing with the ordinary camera, so that a photograph, in which a taking date and/or time are printed, can be obtained.

Further, in this embodiment, when the mode 100 is selected by the mode select switch 22, a taking date, for example, Jan. 1, 1994 is printed to the photograph. And, the mode 130 is selected by the mode select switch 22, a taking time of the photographing, for example, 1st 18:30 is printed. Now, the year information, which is outputted from the timer 40 to the memory 42 is 4bit, that is, 16 kinds. For example, when the year information is 0010, two years may be added to the year in which the IC substrate 30 is assembled to the film unit with the lens.

Figure 5:
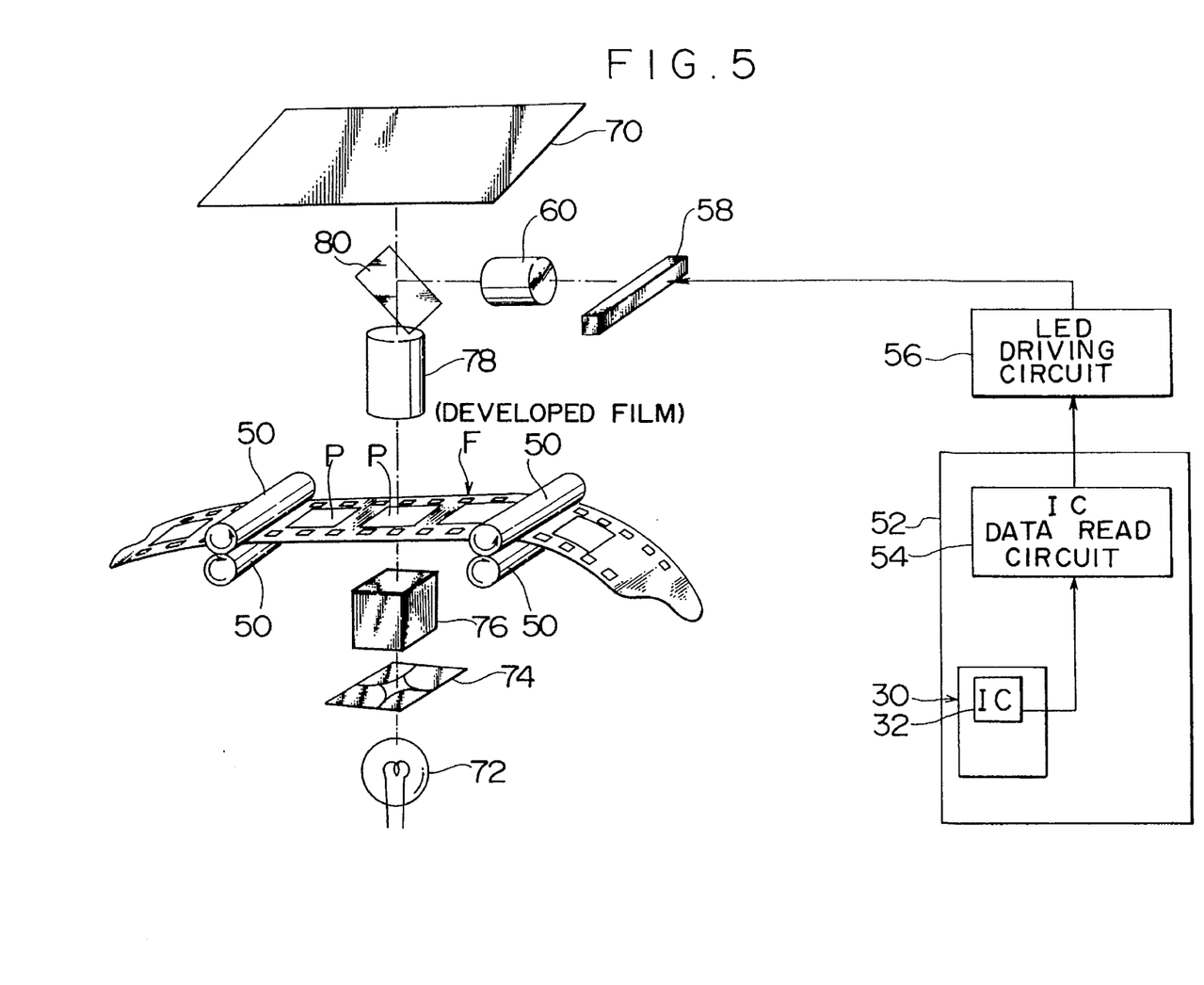
FIG. 5 is an explanatory view showing a second embodiment of the development method for the film unit with the lens.

FIG. 5 shows the second embodiment of the development method of the film unit with the lens according to the present invention, and the same or similar members as the first embodiment shown in FIG. 4 are designated with the same numerals, and the explanations thereof are omitted. In the development method shown in FIG. 5, a taking date and/or time are printed on a printing paper 70 as well as the frame image.

In this embodiment, a developed film is conveyed in the longitudinal direction of the film F by the conveyance rollers 50, 50 . . . and the frame P of the film F is illuminated from the bottom by a lamp 72. The light from the lamp 72 illuminate the frame P through a dimming filter 74 and a diffusion box 76, and the transmitted image is projected on the printing paper 70 by the projecting lens 78. And, the light of the letters and the numerals, which are displayed on the display 58, is irradiated in the horizontal direction with the projecting lens 60 and reflected by a half mirror 80 upward so as to be projected on the printing paper 70. That is, in this embodiment, the information written in the address 1 of the memory 42 is projected on the first printing paper 70 so as to be printed and the information written in the address 2 is printed in the second printing paper 70. This operation is repeated, whereby the printed photograph, in which a taking date and/or time are printed, can be obtained.

Figure 6:
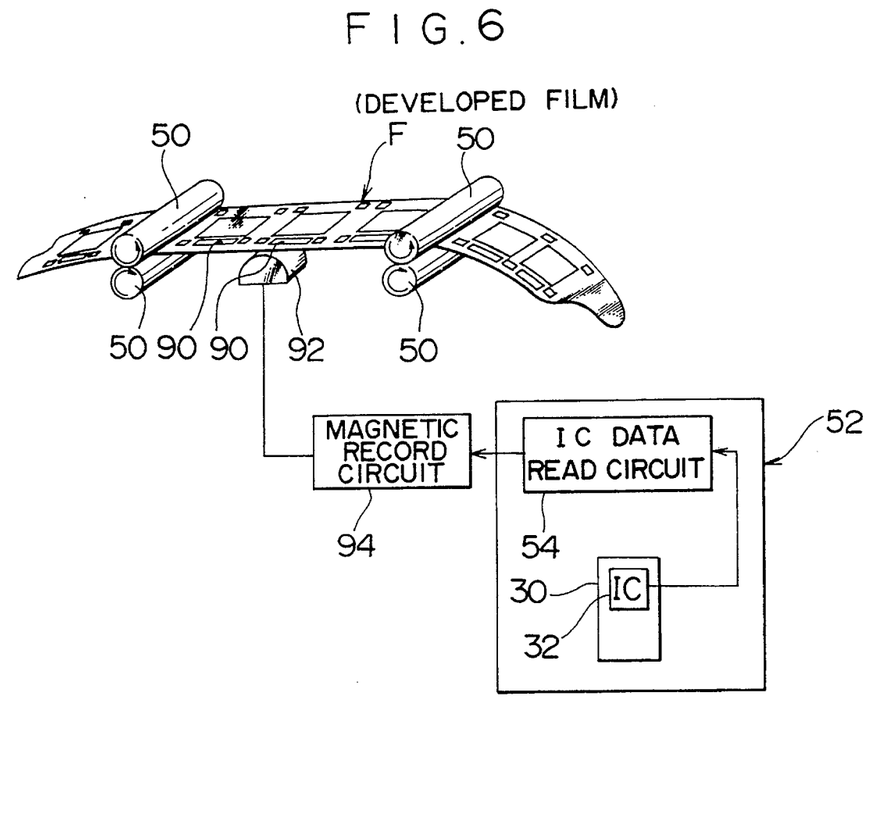
FIG. 6 is an explanatory view showing a third embodiment of the development method for the film unit with the lens.
Figure 7:
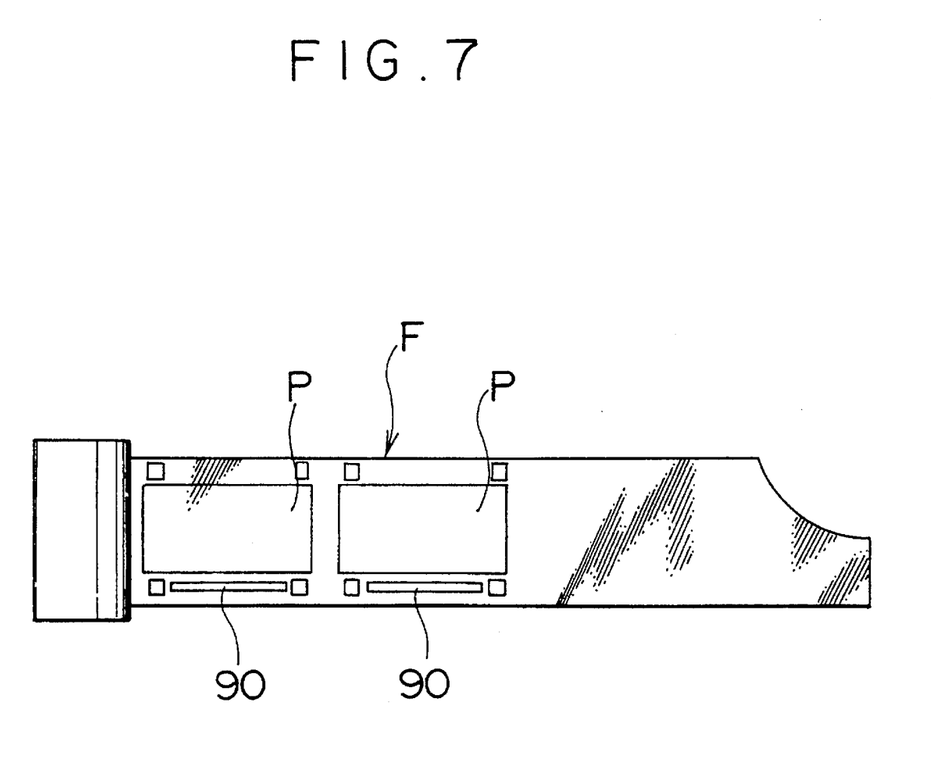
FIG. 7 is a plain view of a photo film in which a magnetic record layer is formed; and, FIG. 8 is an explanatory view showing a third embodiment of the development method for the film unit with the lens.
Figure 8:
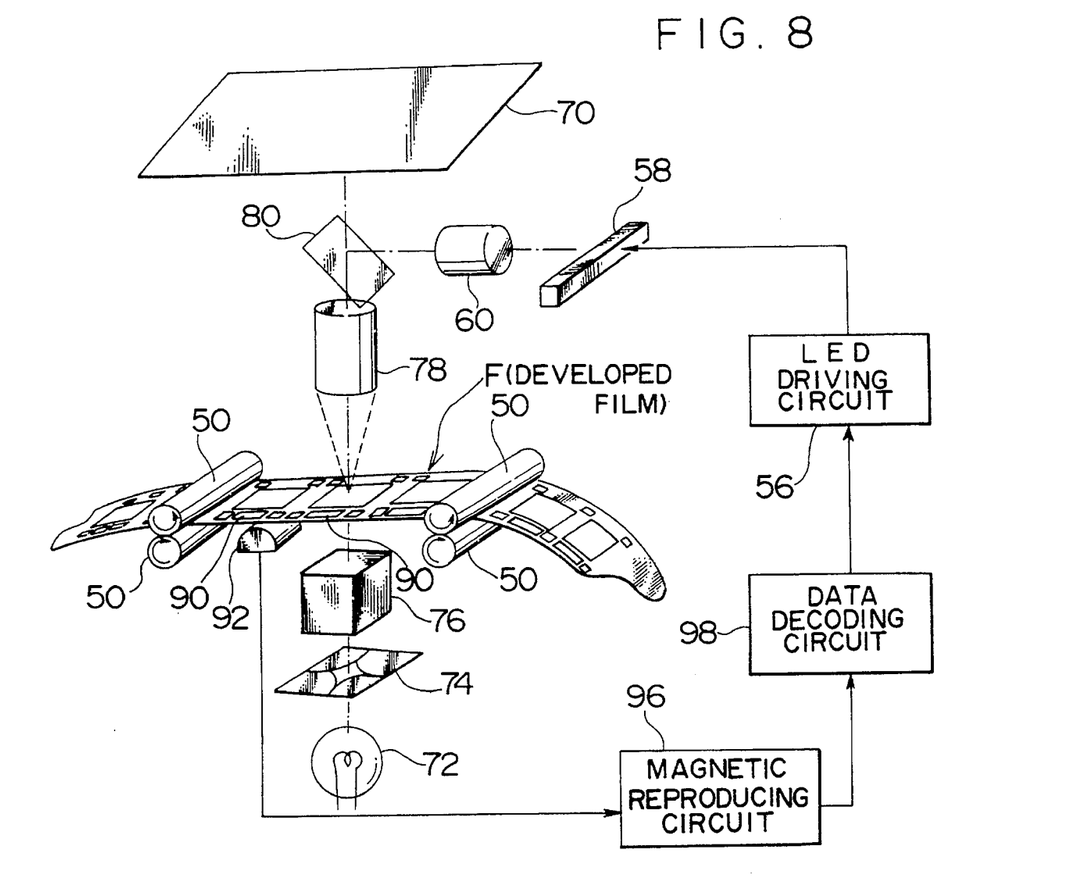

FIGS. 6–8 show the third embodiment of the development method of the film unit with the lens according to the present invention, and the same or similar members as the first embodiment shown in FIG. 4 or the second embodiment shown in FIG. 5 are designated with the same numerals and the explanations thereof are omitted. In the development method shown in FIGS. 6–8, a film, in which a magnetic record layer 90 is formed, is used, and a taking date and/or time are written in the magnetic record layer 90 as magnetic data.

As shown in FIG. 7, the magnetic record layer 90 is provided for every frame P of the film F in the longitudinal direction of the frame P. The film F, as shown in FIG. 6, is conveyed in the longitudinal direction of the film F by the conveyance rollers 50, 50 . . . , and a magnetic head 92 is arranged on the conveyance path so as to come in contact with the magnetic record layer 90. On the other hand, the taking date/time information and the mode information, which are written in the memory of the IC 32, are read out sequentially by the IC data read circuit 54. The read-out information is outputted to the magnetic record circuit 94 sequentially, and the magnetic record circuit 94 drives the magnetic head 92 based on the outputted information.

Therefore, in this embodiment, the information, which is written in the address 1 of the memory 42, is recorded magnetically in the magnetic record layer 90 of the first frame in the film F by the magnetic head 92. When the magnetic layer of the second frame passes through the magnetic head 92, the information, which is written in the address 2, is recorded magnetically in the magnetic record layer 90 of the second frame. This operation is repeated, whereby the information corresponding to the frames can be recorded in all magnetic record layers 90, 90 . . . of the frames in the film F. This magnetic record may be operated before or after the development of the film F.

Next, an explanation will be given of the operation in that the taking date/time are printed on the printing paper 70 with the film which is magnetically recorded. As shown in FIG. 8, the film F is conveyed by the conveyance rollers 50, 50 . . . in the longitudinal direction of the film F, and, the record magnetic data (which is recorded in the magnetic record layer 90 of the frame), just before being illuminated by the lamp 72, is read by the magnetic head 92. The read magnetic data is reproduced by the magnetic reproducing circuit 96 and decoded by the data decoding circuit 98. The decoded information is outputted sequentially to the LED driving circuit 56, and then the LED driving circuit 56 drives the display 58 based on the outputted information. The display 58 displays the letters and the numerals in synchronization with illumination of the frame P (of the frame number corresponding to the information) by the lamp 72. The light of the letters and the numerals is irradiated in the horizontal direction by the projecting lens 60 and refracted upward by the half mirror 80 so as to be projected on the printing paper 70. Therefore, a printed photograph, in which a taking date and/or time is printed, can be obtained.

Moreover, the information recorded in the magnetic record layer 90 can be used also as information for reproducing a film image, which has been taken by an image sensor on a TV monitor.

As described above, in the film unit with the lens according to the present invention, the film unit with the lens is provided with a date record unit which comprises the release detecting means for detecting the release of the shutter in the film unit with the lens, count means for counting the frame number in the film of the film unit with the lens based on the release information from the release detecting means, timer means for timing the current date and/or time, memory means, and writing means for writing the date and/or time information, which is timed by the timer means by interlocking with the release of the shutter, in the memory means so as to correspond with the frame number which is counted by the count means, and the current date and/or time information is written in the memory means corresponding to the frame number in interlocking with the release of the shutter. Therefore, the film unit with the lens can be provided at a lower price than the conventional data taking function.

In the development method of the film unit with the lens according to the present invention, the date record unit is removed from the film unit after photographing. The date and/or time information, which corresponds to the frame number written in the memory means of the date record unit, is read out, and the read-out date and/or time information is printed on each frame of the film, which corresponds to the frame number of the date and/or time information, before the developing of the film. Then the film is developed. Therefore, a printed photograph, in which a date and/or time is printed, can be obtained.

It should be understood, however, that there is no intention to limit the invention to the specific forms disclosed, but, on the contrary, the invention is to cover all modifications, alternate constructions and equivalents falling within the spirit and scope of the invention as expressed in the appended claims.

I claim:

1. A film unit with a lens in which a taking mechanism including a taking lens and a shutter is provided in a light proof case and a film in a roll is loaded in said light proof case;

wherein said film unit is provided with a date record unit which comprises:

release detecting means for detecting a release of said shutter, count means for counting a frame number in said film, based on a release information from said release detecting means, timer means for timing a current date and/or time, memory means, and writing means for writing date and/or time information, which is timed by said timer means in interlocking with the release of said shutter, in the memory means so as to correspond with the frame number which is counted by said count means;

wherein said film unit is free of means for setting said current date.

2. The film unit as set forth in claim 1, wherein said film unit is free of means for displaying said current date.

3. The film unit as set forth in claim 1, wherein said date and/or time information is read by a data reading device only after said date record unit is removed from said film unit.

4. The film unit as set forth in claim 1, wherein said film unit is free of means for reading out said date and/or time information written in said memory means.

5. The film unit as set forth in claim 2, wherein said film unit is free of means for reading out said date and/or time information written in said memory means.

6. A development method of a film unit with a lens in which a taking mechanism including a taking lens and a shutter is provided in a light proof case and a film in a roll is loaded in said light proof case, a date record unit is provided which comprises release detecting means for detecting a release of said shutter, count means for counting a frame number in said film based on a release information from said release detecting means, timer means for timing a current date and/or time, memory means, and writing means for writing date and/or time information, which is timed by said timer means in interlocking with the release of said shutter, in the memory means so as to correspond with the frame number which is counted by said count means;

wherein said date record unit is removed from said film unit with said lens after photographing, said date and/or time information, which corresponds to said frame number written in said memory means, is read out, and then the date and/or time information, which is read out, is exposed on each frame of said film, which corresponds to said frame number of said date and/or time information, before developing and then said film is developed.

7. A development method of a film unit with a lens in which a taking mechanism including a taking lens and a shutter is provided in a light proof case and a film in a roll is loaded in said light proof case, a date record unit is provided which comprises release detecting means for detecting a release of said shutter, count means for counting a frame number in said film based on a release information from said release detecting means, timer means for timing a current date and/or time, memory means, and writing means for writing date and/or time information, which is timed by said timer means in interlocking with the release of said shutter, in the memory means so as to correspond with the frame number which is counted by said count means;

wherein said date record unit is removed from said film unit with said lens after photographing, said date and/or time information, which corresponds to said frame number written in said memory means, is read out, and then the date and/or time information, which is read out, is printed on a photographic paper so as to correspond to a frame number of each frame when a developed film is printed.

8. A development method of a film unit with a lens in which a taking mechanism including a taking lens and a shutter is provided in a light proof case and a film in a roll is loaded in said light proof case, a date record unit is provided which comprises release detecting means for detecting a release of said shutter, count means for counting a frame number in said film based on a release information from said release detecting means, timer means for timing a current date and/or time, memory means, and writing means for writing date and/or time information, which is timed by said timer means in interlocking with the release of said shutter, in the memory means so as to correspond with the frame number which is counted by said count means;

wherein said date record unit is removed from said film unit with said lens after photographing, said date and/or time information, which corresponds to said frame number written in said memory means, is read out, and then the date and/or time information, which is read out, is recorded in a magnetic record layer of each frame of said film, which corresponds to said frame number of said date and/time information.

9. A system for including date and/or time information on photographs from film of a disposable film unit, said system comprising:

said disposable film unit, and development equipment operated according to a development process;

wherein said disposable film unit comprises:

a lens and a shutter, in a light proof case, a roll of film loaded in said case, having a plurality of frames, each frame of which has a corresponding frame number; and a date record unit;

wherein said date record unit comprises:

a release detector indicating a release of said shutter, a frame number counter outputting said frame number corresponding to a current one of said frames, and incrementing said frame number in response to said indication from said release detector, a timer providing a current date and/or time, memory, and means for writing said current date and/or time corresponding to said current frame, and said frame number corresponding to said current frame, in a respective address of said memory, when said release detector indicates said release; and wherein said development process includes the steps of:

removing, from said disposable film unit, said roll of film and said date record unit;

identifying one of said plurality of frames;

reading, from said memory, said date and/or time and said frame number corresponding to said identified frame;

developing said film; and printing one of said photographs from said identified frame, said photograph having thereon information corresponding to said date and/or time read from said memory.

10. The system as set forth in claim 9, wherein said timer is set with said current date and/or time during production of said disposable film unit.

11. The system as set forth in claim 10, wherein:

said date record unit further comprises a battery for powering at least one of said frame number counter, said timer, said memory, and said writing means.

12. The system as set forth in claim 11, wherein:

a format of said current date and/or time is selectable by a user of said disposable film unit.

13. The system as set forth in claim 9, wherein said development process comprises the step of exposing said corresponding date and/or time information read from said memory on said identified frame before said developing step.

14. The system as set forth in claim 9, wherein said development process comprises the step of printing said corresponding date and/or time information read from said memory on said photograph during said printing step.

15. The system as set forth in claim 9, wherein:

said film further comprises a magnetic record layer for each said frame; and said development process further comprises the step of recording said corresponding date and/or time information read from said memory on said magnetic record layer of said identified frame.

16. The system as set forth in claim 15, wherein said magnetic record layer is free of information recorded by said disposable film unit until after said removing step of said development process is performed.

* * * * *